(12) United States Patent
Cross et al.

(10) Patent No.: US 10,167,074 B2
(45) Date of Patent: Jan. 1, 2019

(54) STRUCTURE FORMED FROM COMPOSITE MATERIAL

(71) Applicant: AIRBUS OPERATIONS LIMITED, Bristol (GB)

(72) Inventors: Matthew Cross, Bristol (GB); Andrew Withers, Bristol (GB)

(73) Assignee: Airbus Operations Limited, Bristol (GB)

(*) Notice: Subject to any disclaimer, the term of this patent is extended or adjusted under 35 U.S.C. 154(b) by 0 days.

(21) Appl. No.: 15/381,946

(22) Filed: Dec. 16, 2016

(65) Prior Publication Data

US 2017/0174312 A1 Jun. 22, 2017

(30) Foreign Application Priority Data

Dec. 18, 2015 (GB) .................................. 1522426.4
Oct. 25, 2016 (GB) .................................. 1617999.6

(51) Int. Cl.

| | | |
|---|---|---|
| *B64C 3/20* | (2006.01) | |
| *B32B 15/095* | (2006.01) | |
| *B32B 27/40* | (2006.01) | |
| *B29C 70/88* | (2006.01) | |
| *B32B 15/08* | (2006.01) | |
| *B64D 45/02* | (2006.01) | |

(52) U.S. Cl.
CPC .............. *B64C 3/20* (2013.01); *B29C 70/885* (2013.01); *B32B 15/08* (2013.01); *B32B 15/095* (2013.01); *B32B 27/40* (2013.01); *B64D 45/02* (2013.01); *B32B 2605/18* (2013.01)

(58) Field of Classification Search
CPC ........................................................ B64C 3/20
USPC ............................................................ 428/76
See application file for complete search history.

(56) References Cited

U.S. PATENT DOCUMENTS

2005/0181203 A1 8/2005 Rawlings et al.
2009/0092844 A1* 4/2009 Ware ...................... B32B 33/00
428/457

FOREIGN PATENT DOCUMENTS

WO 2005032812 A2 4/2005
WO WO-2005032812 A2 * 4/2005 ............. B32B 15/08

OTHER PUBLICATIONS

Search Report dated Jun. 30, 2016 in Great Britain Application No. 1522426.4.

* cited by examiner

*Primary Examiner* — Brent T O'Hern
(74) *Attorney, Agent, or Firm* — Jenkins, Wilson, Taylor & Hunt, P.A.

(57) ABSTRACT

A structure formed from composite material and method of forming a structure composite material is disclosed in which one or more metal layers are disposed on the composite material.

13 Claims, 4 Drawing Sheets

STRUCTURE FORMED FROM COMPOSITE MATERIAL

RELATED APPLICATIONS

The present application claims priority from Great Britain Application Numbers 1522426.4, filed Dec. 18, 2015, and 1617999.6, filed Oct. 25, 2016, the disclosure of which are hereby incorporated by reference herein in their entireties.

FIELD OF TECHNOLOGY

The present technology relates to structure formed from composite material. The technology further relates to a composite structure comprising an electrically conductive outer layer for dissipating electric charge and a method of manufacturing such a composite material.

BACKGROUND

Synthetic composite materials such as carbon fibre reinforced plastic (CFRP) commonly comprise a set of one or more layers or plies of carbon fibre cloth or matrix laminated together with a resin to form a desired structure. The carbon fibre plies may be impregnated with resin prior to being laid-up to form the required structure or the resin may be applied to plain carbon fibre plies during the lay-up process. Resins are commonly thermosetting with the laid-up structure being heated, for example, in an autoclave, to cure the structure. The cured structure may, if necessary, be keyed prior to paint being applied.

BRIEF SUMMARY OF THE TECHNOLOGY

An embodiment of the present technology provides a composite structure comprising: a composite structural member formed from a synthetic composite material; a sealant layer disposed on a surface of the composite structural member; a first metallic layer disposed on the sealant layer; a second metallic layer disposed in or on a surface of the composite structural member, and overlapping the first metallic layer wherein the second metallic layer comprises: a fastener region in which one or more fasteners is located, the extent of the first metallic layer being spaced from the fastener region by a predetermined distance, and the sealant layer being configured with an overlap of the second metallic layer.

The sealant layer may be discrete from the composite structural member. The sealant layer may be resiliently deformable. The sealant layer may be impact resistant. The sealant layer may be less than 15 μm thick. The sealant layer may be less than 25 μm thick. The sealant layer may be less than 35 μm thick. The sealant layer may comprise one or more polyurethanes. The sealant layer may comprise a varnish.

The sealant layer may comprise a barrier between the composite structural member and the first metallic layer. The extent of the first metallic layer may be restricted to within a predetermined distance of an edge of the composite structural member.

The first metallic layer may comprise a metal film. The first metallic layer may comprise a thermally applied metal film. The first metallic layer may comprise aluminium or copper or silver or zinc or nickel. The first metallic layer may comprise a metal film less than 15 μm thick. The first metallic layer may comprise a metal film less than 25 μm thick. The first metallic layer may comprise a metal film less than 50 μm thick. The composite material may comprise CFRP.

Another embodiment of the present technology provides a composite structure comprising: a composite structural member formed from a synthetic composite material; a second metallic layer disposed in or on a surface of the composite structural member; a sealant layer disposed on the surface of the composite structural member; and a first metallic layer disposed on the sealant layer, the first metallic layer being configured with an overlap of the second metallic layer.

The overlap may be configured to provide electrical continuity between the first metallic layer and the second metallic layer. The overlap of the sealant layer over the second metallic layer may be substantially equal to or greater than the overlap of the first metallic layer over the second metallic layer. The overlap of the second metallic layer and the first metallic layer may have a generally uniform width. The overlap of the second metallic layer and the first metallic layer may be approximately 10 mm. The first metallic layer may be spaced from the fastener region by approximately 10 mm.

Another embodiment of the present technology provides a method for forming a composite structure comprising the steps of: forming a composite structural member from a synthetic composite material; providing a second metallic layer in or on a surface of the composite structural member, the second metallic layer comprising a fastener region in which one or more fasteners are located; disposing a sealant layer on a surface of the composite structural member; disposing a first metallic layer on the sealant layer, the first metallic layer being disposed so as to overlap the second metallic layer; spacing the first metallic layer from the fastener region by a predetermined distance, and configuring the sealant layer with an overlap of the second metallic layer.

The method may comprise the further step of: applying a keying treatment to the composite structural member prior to disposing the sealant layer. The method may comprise the further step of: applying a keying treatment to the sealant layer prior to disposing the first metallic layer. The method may comprise the further step of: applying a paint system to the first metallic layer and exposed portions of the sealant layer.

A further embodiment of the present technology provides a method for forming a composite structure comprising the steps of: forming a composite structural member from a synthetic composite material; providing a second metallic layer in or on a surface of the composite structural member; disposing a sealant layer on a surface of the composite structural member; and disposing a first metallic layer on the sealant layer, the first metallic layer being disposed so as to overlap the second metallic layer.

BRIEF DESCRIPTION OF THE DRAWINGS

Embodiments of the technology will now be described, by way of example only, with reference to the following drawings in which.

DETAILED DESCRIPTION OF EMBODIMENTS OF THE TECHNOLOGY

Figure 1:
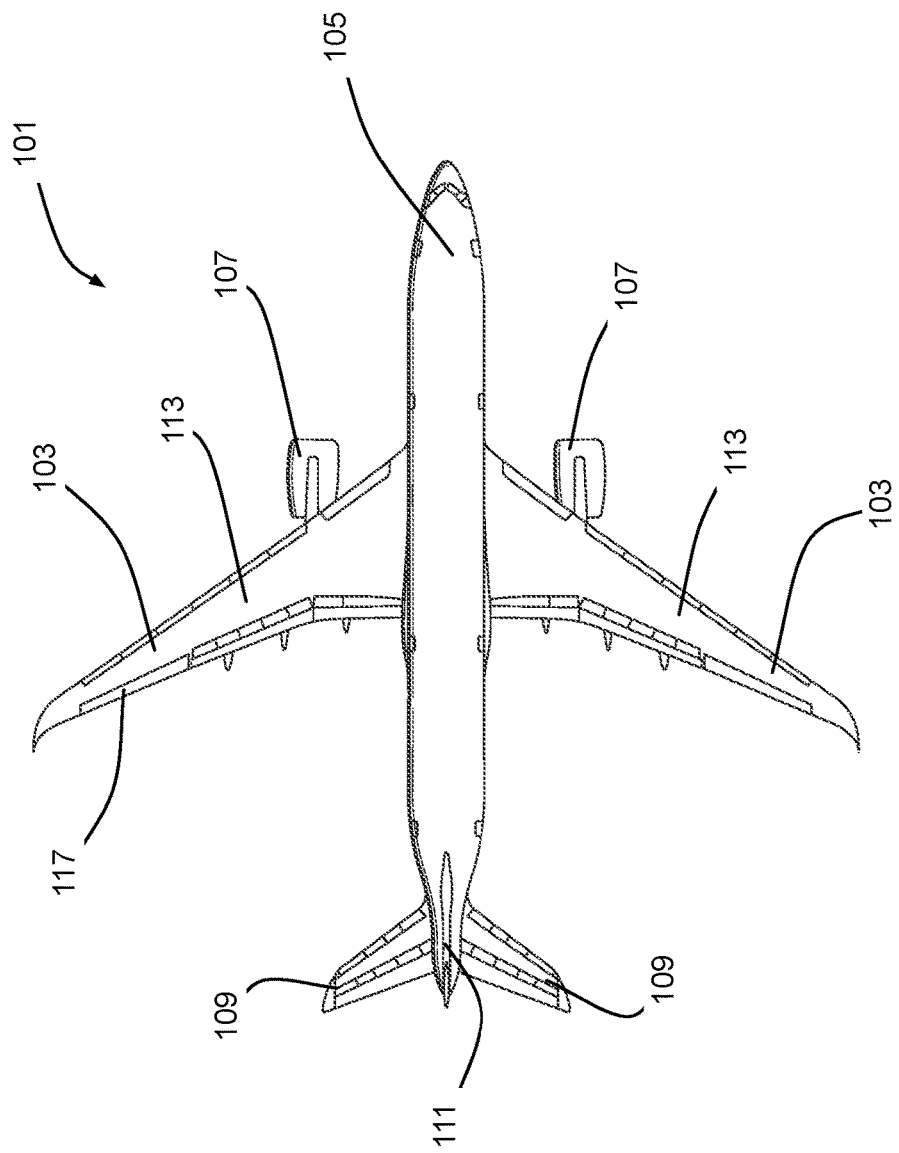
FIG. 1 is a perspective side view of an aircraft partially formed from synthetic composite material in the form of CFRP.

With reference to FIG. 1, an aircraft 101 comprises a pair of wings 103 faired into a fuselage 105. The wings 103 each carry an engine 107. The aircraft further comprises horizontal stabilizers 109 and a vertical tail plane 111 each attached at the rear of the fuselage 105. The aircraft 101 comprises structural elements that are formed from a carbon fibre reinforced plastic material (CFRP). For example, the wings 103 comprise exterior structural members in the form of wing covers 113 formed from CFRP.

Figure 2:
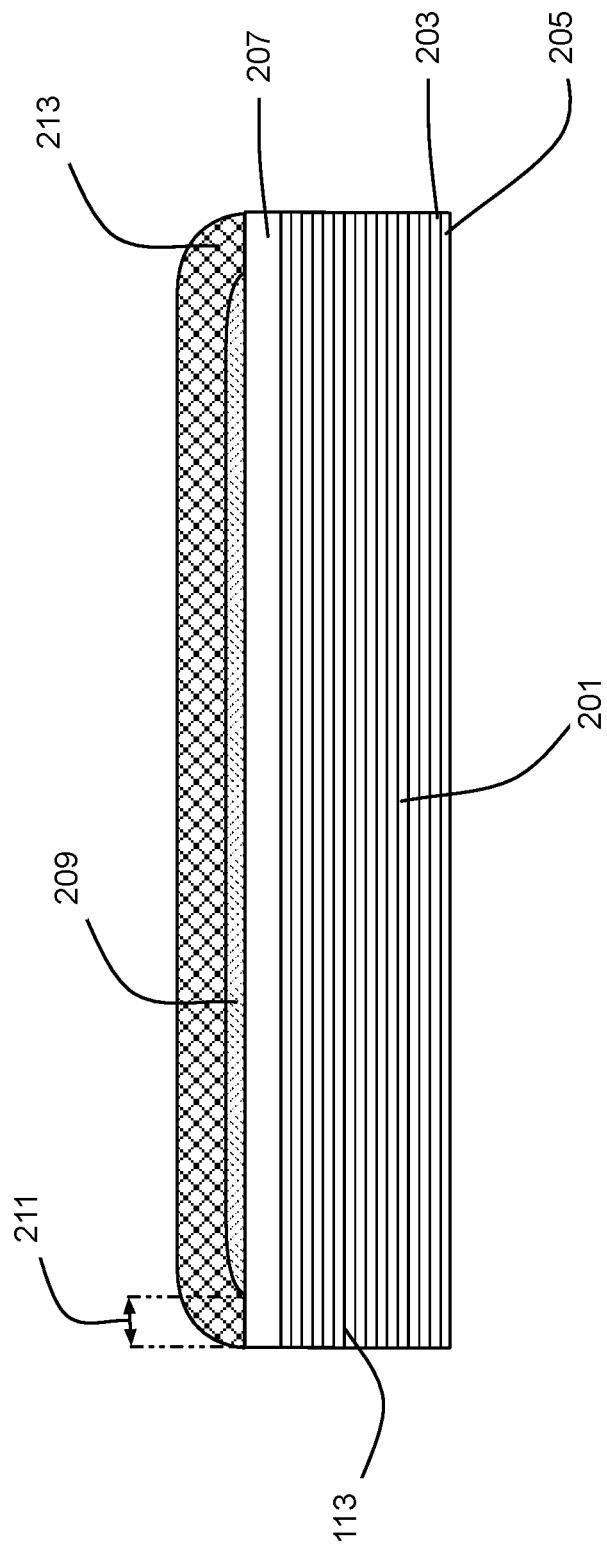
FIG. 2 is a cross sectional view of a CFRP structural element of the aircraft of FIG. 1, in accordance with an embodiment of the present technology.

With reference to the cross sectional view of FIG. 2, each of the wing covers 113 comprises a composite structural member 201 made up of carbon fibre layers 203 bound in matrix layers 205 of a thermoset polymer. A sealant layer 207 substantially covers the upper surface of the wing cover 113 in FIG. 2. In the present embodiment, the sealant layer 207 is approximately 15 μm to 25 μm thick. In the present embodiment, the sealant layer 207 is in the form of a polyurethane ultra-violet light (UV) resistant clear-coat varnish.

The wing cover 113 further comprises a first metallic layer 209 disposed on the exterior surface of the wing cover 113 over the sealant layer 207. In the present embodiment, the extent of the first metallic layer 209 is limited to within the extent of the sealant layer 207. In other words, the first metallic layer 209 extends to within a predetermined distance 211 of the edge of the sealant layer 207 on which it is disposed. In the present embodiment, the predetermined distance is 10 mm. In the present embodiment, the first metallic layer 209 comprises a 15 μm thick layer of aluminium that is applied by a thermal spray deposition method. Aluminium is highly electrically conductive and arranged to dissipate electrical charge in the surface of the wing cover 113 which may, for example, result from lightning strike or static build-up. A paint system 213 is provided on the wing cover 113 over the exposed surfaces of the sealant layer 207 and the first metallic layer 209. The paint system 213 provides environmental protection for the first metallic layer 209 in addition to its aesthetic effects for the wing cover 113.

The sealant layer 207 provides an improved bonding substrate for the first metallic layer 209 when compared to bare composite material. The sealant layer 207 further enables an electrical bonding function to be provided without the need for additional layers of matrix or compatible plies in the surface of the composite material. The sealant layer 207 also seals or covers any exposed carbon fibers in the surface of the composite material. The improved bonding performance provided by the sealant layer 207 further improves the ability of the conductive first metallic layer 209 to electrically bond with other conductive elements so as to effectively conduct or dissipate electrical charge present in the first metallic layer 209.

The sealant layer 207 also serves to reduce the risk of galvanic corrosion of the first metallic layer 209 by electrically insulating the first metallic layer 209 from the carbon fibre 203 in the surface of the wing cover 113. For example, if the sealant layer 207 were absent and the paint system 213 became damaged, electrical contact between the carbon fibre 203 and the exposed first metallic layer 209 may result in galvanic corrosion of the first metallic layer 209 and deterioration of the paint system 213 as the corrosion tracks underneath the paint system 213. If more significant damage occurs that exposes the carbon fibre, with the sealant layer 207 present, galvanic corrosion is limited to the locality of the damage and the speed and extent of the tracking of the corrosion under the paint system 213 is reduced. This effect thereby reduces the urgency of damage repair.

In use, the presence of the sealant layer 207 results in a significant reduction of the erosion of the exterior surface of the paint system 213. In use, the resilient flexure of the sealant layer 207 improves the ability of the paint system to resist erosion from soft or hard particle impact.

Further embodiments of the technology are described below with reference to respective figures in which, for clarity, the same nomenclature is used between figures for elements are common between embodiments.

Figure 3A:
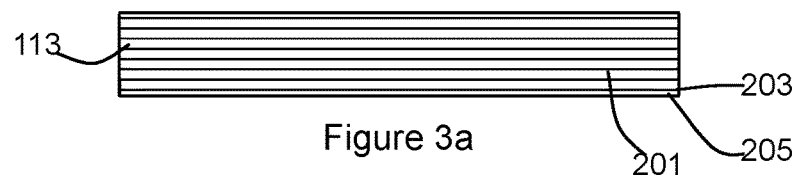
FIGS. 3a to 3f are successive cross sectional views illustrating manufacturing steps for the structural element of FIG. 2.
Figure 3B:
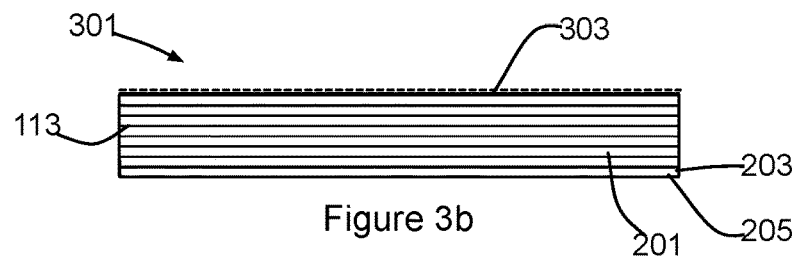
Figure 3C:
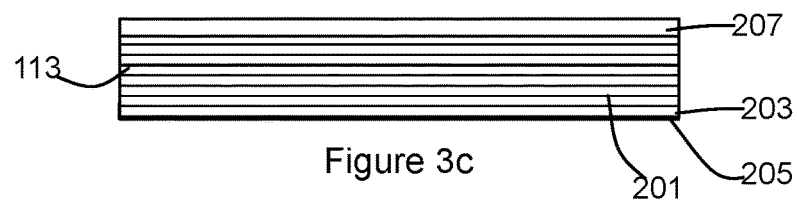
Figure 3D:
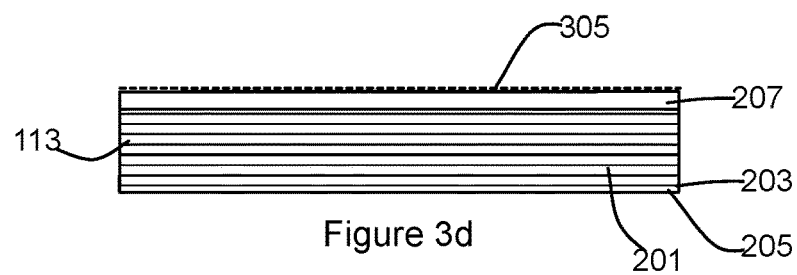
Figure 3E:
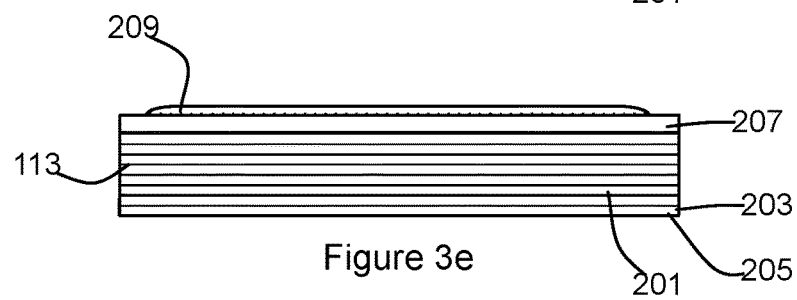
Figure 3F:
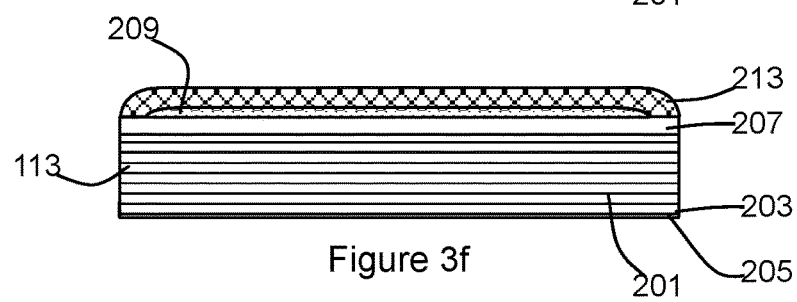

A method for manufacturing the composite structure of FIG. 2 will now be described with reference to FIGS. 3a to 3f. In FIG. 3a, the wing cover 113 is formed using known composite material forming techniques to lay up layers of carbon fibre 203 pre-impregnated with matrix material 205 in the form of thermosetting polymer resin. The wing cover 113 is then heated in an autoclave to cure the CFRP material. With reference to FIG. 3b, a first keying process is applied to the exterior surface 301 of the wing cover 113 to provide a surface key 303 to aid adhesion of the subsequent layer. In the present embodiment, the keying process is grit blasting. With reference to FIG. 3c, the sealant layer 207 is applied to the upper surface 301 substantially covering the whole surface 301. In the present embodiment, the sealant layer 207 comprises a polyurethane material with a finished thickness of up to 15 μm to 35 μm and is applied by spraying. With reference to FIG. 3d, a second keying process is applied to the exterior surface of the sealant layer 207 to provide a second surface key 305 to aid adhesion of subsequent layers. With reference to FIG. 3e, the first metallic layer 209 is applied to the upper surface of the sealant layer 207 up to the predetermined distance 211 from the edges of the sealant layer 207. In the present embodiment, the first metallic layer 209 comprises aluminium with a thickness of up to 15 μm and is applied by thermal spraying. With reference to FIG. 3f, the paint system 213 is then applied to the exposed respective upper surfaces of the sealant layer 207 and the first metallic layer 209. In the present embodiment, the paint system 213 comprises a primer coat and one or more top coats (not shown separately).

Figure 4:
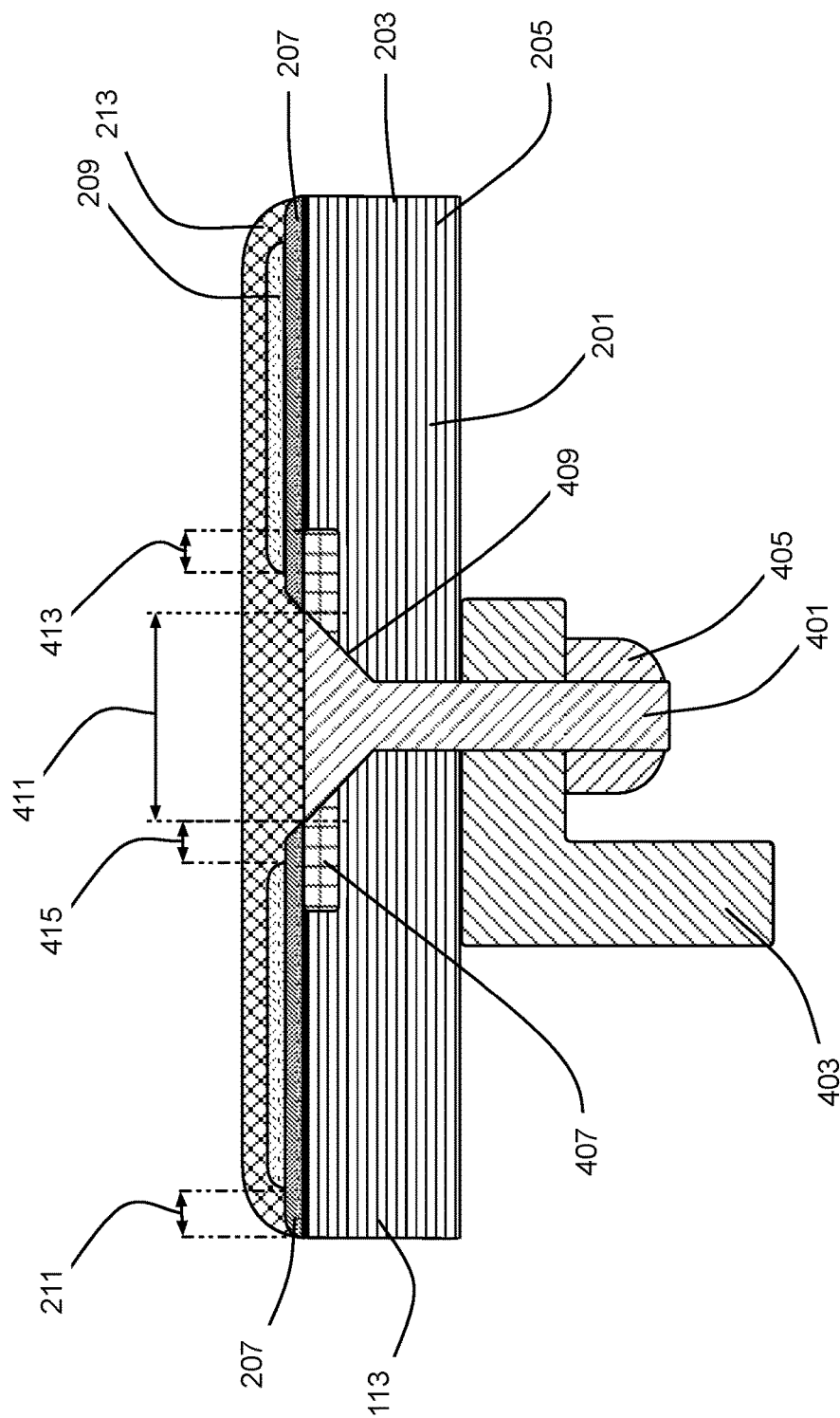
FIG. 4 is a cross sectional view of a CFRP structural element of the aircraft of FIG. 1, in accordance with another embodiment of the present technology.

Another embodiment of the present technology will now be described with reference to the cross sectional view of FIG. 4. In FIG. 4, where parts are substantially common to a previously described embodiment, the same reference numbers are used in order to assist in understanding. In the present embodiment, a row of fasteners 401 (only one shown) fix the wing cover 113 along a structural member 403 in the form of a spar of the wing 103. In the present embodiment, the spar 403 is formed from aluminium. The fasteners 401, in the form of swaged fasteners, are fixed in place by respective swaged collars 405. The wing cover 113 in the present embodiment, further comprises a second metallic layer 407 in the form of an expanded copper foil (ECF) strip. The ECF strip 407 is integrally formed in the upper surface of the wing cover 113. The fasteners 401 are fixed through a fastener region 411 located generally centrally widthwise along the ECF strip 407. In the present embodiment, the fasteners 401 are formed from a titanium alloy and fixed onto the aluminium spar 403 resulting in an electrically conductive path between the outside and the inside of the wing cover 113.

In the present embodiment, the sealant layer 207 extends over the outer surface of the wing cover 113 up to the edge of the holes 409 for the fasteners 401. The first metallic layer 209 on the sealant layer 207 extends over the edge of the ECF strip 407 so as to form an overlap 413 of a predetermined width configured to provide electrical continuity between the first metallic layer 209 and the ECF strip 407. In the present embodiment, the overlap 413 has a width of at least 10 mm. The edge of the first metallic layer 209 is spaced a predetermined distance 415 from the fastener region 411 of the ECF strip 407. The predetermined distance 415 is configured so as to reduce the probability of galvanic corrosion in response to electrical continuity between the first metallic layer 209 and the fastener 401 enabled by a failure in the paint system 213 adjacent the head 401. In the present embodiment, the predetermined distance is 10 mm.

The method of manufacturing the composite structure of FIG. 4 will now be described by way of the additional steps to the method described above with reference to FIGS. 3*a* to 3*f*. In the first step described with reference to FIG. 3*a* above, the second metallic layer 407 in the form of the ECF strip is integrally formed with the composite structural member 201 in the form of the wing cover 113. Steps 3*b*, 3*c* and 3*d* are then performed as described above. After the step described with respect to FIG. 3*d*, the holes 409 are drilled through the wing cover 113 and spar 403 and the fasteners 401 fitted so as to fix the wing cover 113 to the spar 403. In step 3*e*, prior to the first metallic layer 209 being applied the fastener region 411 and the predetermined spacing 415 either side is masked. After the first metallic layer 209 has been applied the masking is removed leaving a gap in the first metallic layer 209 corresponding to the fastener region 411 and the adjacent predetermined spacings 415. The paint system 213 is then applied as described with reference to FIG. 3*f*.

In another embodiment, prior to the application of the sealant layer 207 the fastener region 411 is masked. After the sealant layer 207 has been applied the masking is removed leaving the fastener region 411 free of the sealant layer 207. In a further embodiment, the sealant layer is applied over the drilled holes 409 or over the fitted fasteners 401 without masking resulting sealant layer 207 extending into the holes 409 or over the heads of the fasteners 401.

In another embodiment, the first metallic layer 209 is applied prior to the drilling of the holes 409 or prior to the fitting of the fasteners 401.

As will be understood by those skilled in the art, the fasteners 401 may be sleeved fasteners to ensure full electrical bonding between the fasteners 401 and the wing cover 113 and spar 403 or nut caps may be used which are configured to contain outgassing of plasma resulting from arcing between the fasteners 401 and the wing cover 113 and spar 403.

In another embodiment, the sealant layer 207 is up to 50 µm thick. In another embodiment of the technology, the first metallic layer 209 is up to 25 µm thick. In a further embodiment of the technology, the first metallic layer 209 is up to 50 µm thick.

As will be understood by those skilled in the art, the sealant layer may be formed from any suitable sealant material. The sealant may be solvent based, an emulsion where the carrier may be water based, thermosetting or thermoplastic or a chemically setting material such as an epoxy system. The sealant may be applied by any suitable deposition technique such as spraying, painting or vapour deposition.

As will be understood by those skilled in the art, the keying technique is not limited to grit blasting as described above but keying may be achieved by any other suitable method of roughening or ablating a surface. Examples of possible suitable techniques include the application of a mechanical tool or material, chemical etching, the inclusion of a sacrificial peel ply in the surface of the composite material, laser ablation or other non-intrusive keying techniques or processes. As will be understood by those skilled in the art, in some applications, keying techniques may not be necessary where the surface of the composite material provides a surface to which the sealant layer adheres to an acceptable degree for the given application.

As will be understood by those skilled in the art, the first or second metallic layers may be formed from any other suitable metal such as copper or silver or zinc or nickel. The first or second metallic layers may be disposed on the structural member by any suitable means not limited to thermal spray, for example, cold metal spray, plasma or vapour deposition, additive manufacturing or printing.

As will be understood by those skilled in the art, the second metallic layer may be formed from any suitable metal formed in any suitable format. For example, bronze mesh may be used as one alternative to ECF.

As will be understood by those skilled in the art, the technology described herein is not limited in application to any particular structure but may be applied to any structure of an aircraft. As will be understood by those skilled in the art, the present technology may be applied to any type of structure, including automotive, space, maritime or civil engineering structures, where a conductive exterior layer is affixed to a composite structural element. The technology may be applied to a selected part or substantially the whole of any such structure.

As will be understood by those skilled in the art, the whole or a selected part or layer of the structure in accordance with the technology described herein may be constructed using additive manufacturing (ALM) techniques or three-dimension printing (3DP) techniques. For example, the sealant or metallic layers may be applied to a composite part by ALM or 3DP.

While the present technology has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the technology in its broader aspects is not limited to the specific details of the representative apparatus and method, and illustrative examples shown and described. Accordingly, departures may be made from such details without departure from the scope of applicant's general inventive concept.

The invention claimed is:

1. A composite structure comprising:
   a composite structural member formed from a synthetic composite material;
   a sealant layer disposed on a surface of the composite structural member;
   a first metallic layer disposed on the sealant layer; and
   a second metallic layer comprising a fastener region, in which one or more fasteners are located, an extent of the first metallic layer being spaced from the fastener region by a predetermined distance, wherein the second metallic layer is disposed in or on a surface of the composite structural member and is overlapped by the first metallic layer, and wherein the sealant layer overlaps the second metallic layer.

2. A composite structure according to claim 1, wherein the sealant layer is discrete from the composite structural member.

3. A composite structure according to claim 1, wherein the sealant layer is resiliently deformable.

4. A composite structural member according to claim 1, wherein the sealant layer comprises one or more polyurethanes.

5. A composite structure according to claim 1, wherein the sealant layer is configured as a barrier between the composite structural member and the first metallic layer.

6. A composite structure according to claim 1, wherein the extent of the first metallic layer is restricted to within a predetermined distance of an edge of the composite structural member.

7. A composite structure according to claim 1, wherein the first metallic layer comprises a thermally applied metal film.

8. A composite structure according to claim 1, wherein a portion of the first metallic layer overlapping the second metallic layer is configured to provide electrical continuity between the first metallic layer and the second metallic layer.

9. A composite structure according to claim 1, wherein an overlap of the sealant layer over the second metallic layer is substantially equal to or greater than an overlap of the first metallic layer over the second metallic layer.

10. A composite structure according to claim 1, wherein an overlap of the second metallic layer and the first metallic layer has a generally uniform width.

11. A composite structure comprising:
a composite structural member formed from a synthetic composite material;
a metal layer disposed in or on a surface of the composite structural member;
a sealant layer disposed on the surface of the composite structural member; and
a metallic layer comprising a fastener region, in which one or more fasteners are located, an extent of the metallic layer being spaced from the fastener region by a predetermined distance, wherein the metallic layer is disposed on the sealant layer and overlaps the metal layer, and wherein the sealant layer overlaps the metallic layer.

12. A method for forming a composite structure comprising:
forming a composite structural member from a synthetic composite material;
disposing a sealant layer on a surface of the composite structural member;
disposing a first metallic layer on the sealant layer;
disposing a second metallic layer in or on a surface of the composite structural member, wherein the second metallic layer comprises
a fastener region, in which one or more fasteners is located, an extent of the first metallic layer being spaced from the fastener region by a predetermined distance, wherein the first metallic layer overlaps the second metallic layer, and wherein the sealant layer overlaps the second metallic layer.

13. A method for forming a composite structure comprising:
forming a composite structural member from a synthetic composite material;
providing a second metallic layer in or on a surface of the composite structural member, the second metallic layer comprising a fastener region, in which one or more fasteners are located;
disposing a sealant layer on the surface of the composite structural member;
disposing a first metallic layer on the sealant layer, the first metallic layer being disposed to overlap the second metallic layer; and
spacing the first metallic layer from the fastener region by a predetermined distance, wherein the sealant layer overlaps the second metallic layer.

* * * * *